Dec. 20, 1955  B. F. ZIEGLER, JR  2,727,762
TUBE COUPLINGS
Filed Oct. 11, 1954
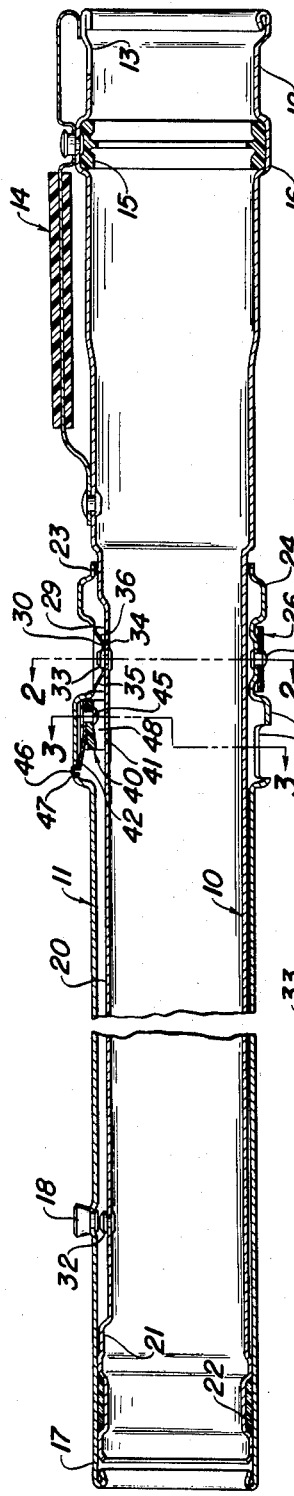
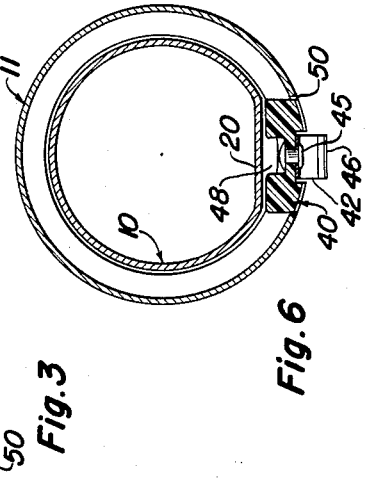
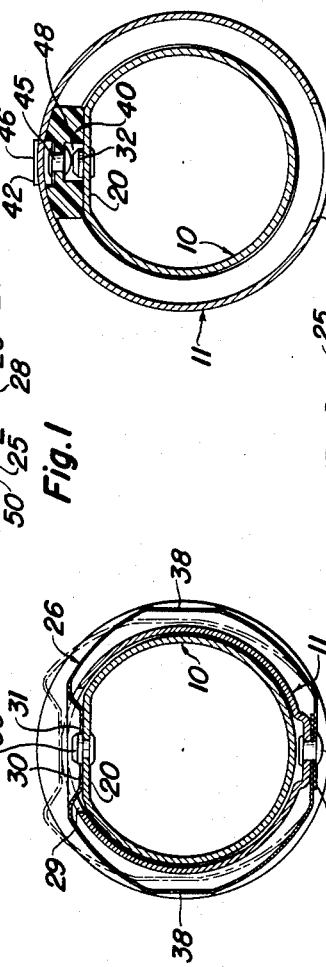
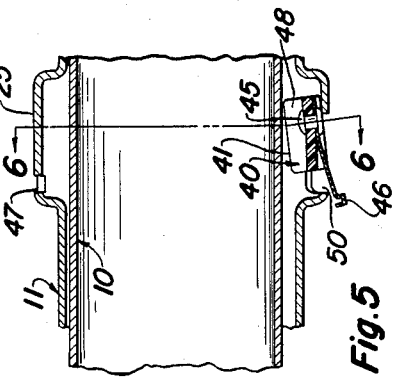
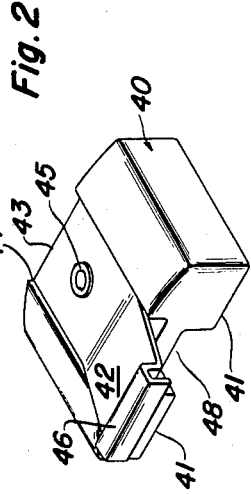

United States Patent Office 2,727,762
Patented Dec. 20, 1955

2,727,762

TUBE COUPLINGS

Brandt F. Ziegler, Jr., North Canton, Ohio, assignor to The Hoover Company, North Canton, Ohio, a corporation of Ohio Application October 11, 1954, Serial No. 461,466

6 Claims. (Cl. 285—169)

The present invention relates to a coupling for telescoped tubes and more particularly to aligning the tubes during relative movement.

An object of the invention is to provide tube aligning means to position the tubes with respect to each other during telescoping movement. Another object is to provide tube aligning means to guide the movement of telescoping tubes to their fully extended and retracted positions. A further object is to provide tube aligning means to position telescoping tubes for engagement with a coupling. Other objects and advantages of the invention will become apparent from the following description and drawings, wherein:

Figure 1 is a broken longitudinal sectional view of the telescoped tubes locked in retracted position, Figure 2 is a section along the line 2—2 of Figure 1, Figure 3 is a section along the line 3—3 of Figure 1, Figure 4 is a perspective view of the tube aligning device, Figure 5 is a sectional view illustrating the first step in assembling the tube aligning device between the telescoped tubes, and Figure 6 is a section along the line 6—6 of Figure 5.

The embodiment of the invention herein disclosed comprises an inner tube 10 and an outer tube 11 mounted for telescoping movement and adapted for use in conveying air to and from a suction cleaner. The outer end 12 of the inner tube 10 has a marginal slot 13 and a cooperating leaf spring latch 14 for receiving a pin on an unshown surface cleaning tool which seats against a seal 15 in an annular rib 16. The end 17 of the outer tube 11 is provided with a pin 18 for attachment to an unshown suction cleaner or hose in a manner well known in the art. The inner tube 10 has a longitudinally extending flat wall portion 20 terminating in a circular end 21 provided with an annular packing member 22 which slidably engages the inner surface of the outer tube 11 to provide a substantially airtight seal therebetween.

At the end 23 of the outer tube 11 are a pair of spaced ribs 24 and 25 between which is arranged an oval shaped spring 26 secured to the tube 11 at one end 27 of its minor axis by a rivet 28. Diametrically opposite the rivet 28 is an opening 29 in the outer tube 11 through which projects a depressed latch seat 30 of the spring 26 and is provided with a port 31 adapted to receive either one of pins 32 or 33 mounted on the flat wall portion 20 of the inner tube. The lower surface 34 of the latch seat 30 rides on the flat wall portion 20 of the inner tube and has upwardly inclined cam surfaces 35 and 36 respectively engageable with the pins 32 and 33 which lift the spring 26 from the flat wall 20 for entrance into the port 31 when the tubes are moved to their extended and retracted positions. The opposite ends 38—38 of the major axis of the spring 26 normally are spaced from the outer surface of the tube 11, whereby pressure exerted at 38—38 causes the depressed latch seat 30 to be raised above either of the pins 32—33 to release the latter for telescoping movement of the tubes.

Arranged in the recess of the annular rib 25 opposite the flat wall 20 is a tube aligning member or guide 40 having a flat surface 41 which engages the flat wall 20 of the inner tube. A leaf spring 42 has one end 43 seated in a recess 44 of the guide member 40 and is secured to the latter by a rivet 45, and the opposite end of the spring has an angular lug 46 which projects through an opening 47 in the rib 25 to lock the guide 40 to the rib 25. The spring 42 is stressed to urge the guide 40 inwardly of the outer tube 11 so that the surface 41 at all times bears against the flat wall 20 to prevent rotation of the inner tube 10. A slot 48 in the bearing surface 41 of the guide 40 permits the pin 32 to move therepast when the tubes are telescoped to fully extended or collapsed positions.

In order to insert the guide member 40 between the tubes, the inner tube is rotated to position the flat wall 20 in alignment with an opening 50 formed in the wall of the rib 25 opposite the spring anchoring port 47 so that the member 40 can be initially inserted within the rib 25 as shown in Figure 5. The member 40 is then moved completely within the recess of the rib 25 and the spring 42 depressed so that the inner tube 10 can be rotated 180°. During such rotation the tubular flat portion 20 causes the guide member 40 to move with the inner tube 10 to register the spring anchor 46 with its locking opening 47 and thereafter the lug 46 is shifted by the spring into the opening 47 to lock the guide member 40 in the position shown in Figure 1. If the tubes are to be completely disconnected the lug 46 is depressed through the opening 47 and the inner tube 10 rotated 180° to move the member 40 into alignment with the assembly opening 50 for removal therethrough as shown in Figure 5.

In operation, if the tubes 10—11 are fully collapsed, as shown in Figure 1, and it is desired to shift the tubes to their fully extended position, the operator exerts pressure at the opposite ends 38—38 of the major axis of the spring 26 and causes the latch seat 30 to be raised above the pin 33 as shown in dotted lines in Figure 2 to thereby unlock the tubes and permit relative extension of the latter. During movement of the tubes 10—11 the pin 32 passes through the slot 48 in the guide member 40 and then engages the cam surface 35 to raise the spring latch 30 away from the flat wall portion 20 and enters the opening 31 at which time the spring 26 is contracted along its minor axis to engage the flat wall 20 and lock the tubes 10—11 in fully extended position. In order to retract the extended tubes the operator exerts pressure on the spring 26 at its major axis 38—38 to raise the latch seat 30 from the pin 32 and thereafter the tubes are free to be telescoped inwardly since the slot 48 allows the pin 32 to move therepast. When the pin 33 engages the cam surface 36 it raises the latch seat 30 so that the pin 33 can enter the opening 31 and lock the tubes in fully retracted position. During relative movement of the tubes 10—11 the surface 41 on the guide member 40 rides on the flat portion 20 of the inner tube 10 to at all times maintain both tubes in alignment and position the pins 32 and 33 for engagement with the opening 31 in the latch seat 30.

While I have shown and described but one embodiment of my invention, it is to be understood that this embodiment is to be taken as illustrative only and not in a limiting sense. I do not wish to be limited to the particular structure shown and described but to include all equivalent variations except as limited by the scope of the claims.

I claim:

1. A coupling and aligning device for air conveying tubes comprising: inner and outer tubes mounted for telescopic movement, a plurality of spaced pin means on said inner tube representing different extended lengths of said tubes, means on said outer tube removably engageable with said pin means to lock said tubes, means on said inner and outer tubes to guide said tubes in preset alignment during said telescopic movement to different locked positions, said guide means formed for movement of said pin means therebetween to permit extension and collapsing of said tubes to provide various lengths of air conducting tubing.

2. A coupling and aligning device for air conveying tubes comprising: inner and outer circular air conducting tubes mounted for telescopic movement, said inner tube having a longitudinally extending exterior flat wall portion, guide means on said outer tube extending interiorly thereof into engagement with said flat wall portion to maintain said tubes in preset alignment during said telescoping movement, a plurality of spaced pin means projecting from said flat wall portion and representing different extended lengths of said tubes, means on said outer tube removably engageable with said pin means to lock said tubes, and said guide means formed for movement of said pin means thereunder to permit extension and collapsing of said tubes to provide various lengths of air conducting tubing.

3. A tube aligner comprising inner and outer tubes mounted for telescopic movement, said inner tube having a longitudinally extending exterior flat wall portion, a recess formed in said outer tube and having a mouth exposed to said inner tube, guide means in said recess and projecting through said mouth into engagement with said flat wall portion to maintain said tubes in preset alignment during said telescoping movement, means defining an opening in the wall of said recess for inserting said guide means into said recess, and cooperating latch means on said guide means and outer tube for positioning said guide means in said recess with respect to said flat wall portion.

4. A coupling for air conveying tubes comprising: inner and outer circular air conducting tubes mounted for telescopic movement, said inner tube having a longitudinally extending exterior flat wall portion, a plurality of spaced pin means projecting from said flat wall portion for movement within said outer tube and representing different extended lengths of said tubes, an elliptical spring on the exterior of said outer tube and having a depressed portion at its minor axis extending through an opening in said outer tube exposed to said flat wall portion, a hole in said depressed portion for receiving each of said pin means to lock said tubes in different telescoped positions, said spring at its major axis being spaced from said outer tube whereby pressure exerted thereon flexes said depressed portion out of engagement with said pin means to unlock said tubes for movement of said inner tube and its pin means with respect to said outer tube.

5. A coupling as described in claim 4, and guide means on said outer tube extending interiorly thereof into engagement with said flat wall portion to maintain said tubes in preset alignment during telescoping movement to different extended positions.

6. A coupling and aligning device for suction cleaner tubes conveying dirt laden air from a nozzle to the source of suction comprising: inner and outer air conducting tubes mounted for movement with respect to each other, said inner tube having a longitudinally extending exterior flat wall portion, guide means on said outer tube extending inwardly thereof into engagement with said flat wall portion to maintain said tubes in preset alignment during telescoping movement of said tubes, a plurality of spaced pins projecting from said flat wall portion and representing different extended lengths of said tubes, an elliptical spring on the exterior of said outer tube and having a depressed portion at its minor axis extending through an opening in said outer tube exposed to said flat wall portion, a hole in said depressed portion for reeciving each of said pin means to lock said tubes in different telescoped positions, said spring at its major axis being spaced from said outer tube whereby pressure exerted thereon flexes said depressed portion out of engagement with said pins to unlock said tubes, and said guide means being formed for movement of said pins therepast to permit extending and collapsing said tubes to provide various lengths of air conducting tubing.

References Cited in the file of this patent

UNITED STATES PATENTS 1,918,519     Clements _____ July 18, 1933